(12) United States Patent
Gauggel

(10) Patent No.: US 12,201,495 B2
(45) Date of Patent: Jan. 21, 2025

(54) BONDED RETAINER

(71) Applicant: CA-DIGITAL GMBH, Hilden (DE)

(72) Inventor: Markus Gauggel, Duesseldorf (DE)

(73) Assignee: CA-DIGITAL GMBH, Hilden (GB)

( * ) Notice: Subject to any disclaimer, the term of this patent is extended or adjusted under 35 U.S.C. 154(b) by 444 days.

(21) Appl. No.: 17/467,237

(22) Filed: Sep. 5, 2021

(65) Prior Publication Data

US 2022/0054228 A1    Feb. 24, 2022

Related U.S. Application Data

(63) Continuation of application No. PCT/EP2020/055733, filed on Mar. 4, 2020.

(30) Foreign Application Priority Data

Mar. 5, 2019    (DE) .................. 102019105501.6

(51) Int. Cl.
*A61C 5/00*    (2017.01)
(52) U.S. Cl.
CPC ........ *A61C 5/007* (2013.01); *A61C 2201/007* (2013.01)
(58) Field of Classification Search
CPC ........... A61C 7/16; A61C 17/20; A61C 5/007; A61C 2201/007
See application file for complete search history.

(56) References Cited

U.S. PATENT DOCUMENTS

| | | | | |
|---|---|---|---|---|
| 1,002,536 A | * | 9/1911 | Montag | A61C 7/00 433/22 |
| 4,842,513 A | * | 6/1989 | Haarmann | A61C 7/16 433/8 |
| 2008/0057460 A1 | * | 3/2008 | Hicks | A61C 7/145 433/20 |
| 2009/0280450 A1 | * | 11/2009 | Kuo | A61C 7/16 433/9 |
| 2016/0058527 A1 | * | 3/2016 | Schumacher | A61C 7/08 433/24 |
| 2017/0360534 A1 | * | 12/2017 | Sun | B33Y 70/10 |
| 2019/0090984 A1 | * | 3/2019 | Martz | A61C 7/08 |

FOREIGN PATENT DOCUMENTS

| | | |
|---|---|---|
| DE | 102013204359 A1 | 3/2016 |
| DE | 102017104813 A1 | 9/2018 |
| DE | 102016109007 A1 | 3/2019 |
| JP | 2015096243 A | 5/2015 |
| WO | WO2004028394 A1 | 4/2004 |

* cited by examiner

*Primary Examiner* — Jacqueline T Johanas
*Assistant Examiner* — Drew S Folgmann
(74) *Attorney, Agent, or Firm* — Von RohrschledtPatents

(57) ABSTRACT

A bonded retainer configured to stabilize a plurality of teeth in a jaw, the bonded retainer including a contact surface that is aligned overall with a parabolic curvature of the jaw in a longitudinal direction of the bonded retainer and that is aligned locally with a lingual surface contour of the teeth; a lingual surface that extends lingually in parallel with the contact surface, and retentions that extend from the lingual surface transversal to the longitudinal direction.

11 Claims, 5 Drawing Sheets

BONDED RETAINER

RELATED APPLICATIONS

This application is a continuation of International application PCT/EP2020/055733 filed on Mar. 4, 2020 claiming priority from German Patent Application DE 10 2019 105 501.6 filed on Mar. 5, 2019, both of which are incorporated in their entirety by this reference.

FIELD OF THE INVENTION

The invention relates to a bonded retainer configured to stabilize a plurality of teeth in a jaw.

BACKGROUND OF THE INVENTION

Retainers are devices configured to permanently stabilize teeth of a patient completing an orthodontic treatment, in particular to correct a misalignment. Due to the retainer the jaw bone can grow together with roots of the teeth in the new orthodontic position. The risk of a backward movement can thus be reduced. A bonded retainer also designated as fixed retainer is glued together with the surface of the teeth. A wire shaped bonded retainer of the generic type recited supra is known from DE 10 2013 204 359 A1. DE 10 2016 109 007 A1 proposes to produce the bonded retainer recited supra from PEEK by 3D printing. Bonded retainers from plural stranded or braided individual wires are well known in the art.

BRIEF SUMMARY OF THE INVENTION

Thus, it is an object of the invention to improve stability of the retainer. Improving upon the known bonded retainer the invention proposes a bonded retainer configured to stabilize a plurality of teeth in a jaw, the bonded retainer including a contact surface that is aligned overall with a parabolic curvature of the jaw in a longitudinal direction of the bonded retainer and that is aligned locally with a lingual surface contour of the teeth; a lingual surface that extends lingually in parallel with the contact surface, and retentions that extend from the lingual surface transversal to the longitudinal direction. During bonding the glue permeates between the retentions and prevents a sliding of the bonded retainer in its longitudinal direction in the glue joint by form locking. The retentions can be placed onto the lingual surface or can be fabricated in the lingual surface.

Advantageously the retentions have a local height of more than 0.05 mm in a bonded retainer according to the invention. At least five retentions sufficiently secure the bonded retainer in the glue joint. Advantageously the retentions have a height of more than 0.1 mm, further advantageously more than 0.15 mm. Increasing the height of the retentions facilitates reducing the number of the retentions per glue joint.

Advantageously the lingual surface of a bonded retainer according to the invention is profiled like a saw blade. A uniform spacing of notches provides a uniform firm fixing of the bonded retainer in the glue joint.

Advantageously a bonded retainer according to the invention is cut from a plate into a wire shape so that the contact surface, the lingual surface and two parallel sections of a surface of the plate form a diamond shaped cross section of the bonded retainer.

Advantageously a sheet from which a bonded retainer according to the invention is cut is made from a shape memory material. A retainer cut from this material reliably assumes the originally cut shape again after the load is removed. Advantageously the sheet is made from a nickel titanium alloy, further advantageously Nitinol. These alloys are particularly suitable for producing a bonded retainer according to the invention. Alternatively, a retainer according to the invention can be cut from titanium or steel sheet material or can be bent from a titanium or steel wire.

Advantageously the cross section of a bonded retainer according to the invention has edge lengths of not more than 0.7 mm. A retainer of this type is perceived to cause particularly little discomfort. Advantageously the cross section has edge lengths of not more than 0.5 mm, further advantageously not more than 0.3 mm. Mechanical stability of the retainer increases with increasing cross section.

Advantageously a bonded retainer according to the invention can be produced by 3D printing. 3D printing produces the bonded retainer in layers that generate a three-dimensional structure.

Advantageously a bonded retainer of this type is made from a thermoplastic synthetic material. Thermoplastic synthetic materials can be processed in a particularly simple manner by 3D printing or milling. In particular polyetheretherketone (PEEK) can be used to produce a bonded retainer according to the invention. Alternatively, also polyetherketone fluor synthetic material like poly vinylidenfluoride (PVFD) and polyoximethylene (POM) or polyimides like polyetherimide (PEI) can be used. Alternatively, a bonded retainer according to the invention can be made from a synthetic resin, ceramics or metal.

Advantageously the retentions are configured mushroom shaped in a bonded retainer according to the invention. The retentions then fix the bonded retainer particularly well in the glue joint.

Further advantageously a bonded retainer can be milled from metal.

Advantageously a surface of a bonded retainer according to the invention is polished. A retainer of this type causes very little discomfort. Advantageously the surface is treated by electro polishing or plasma polishing. These methods are particularly suitable for polishing nickel titanium alloys.

BRIEF DESCRIPTION OF THE DRAWINGS

The invention is subsequently described based on embodiments with reference to drawing figures, wherein.

DETAILED DESCRIPTION OF THE INVENTION

Figure 1A:
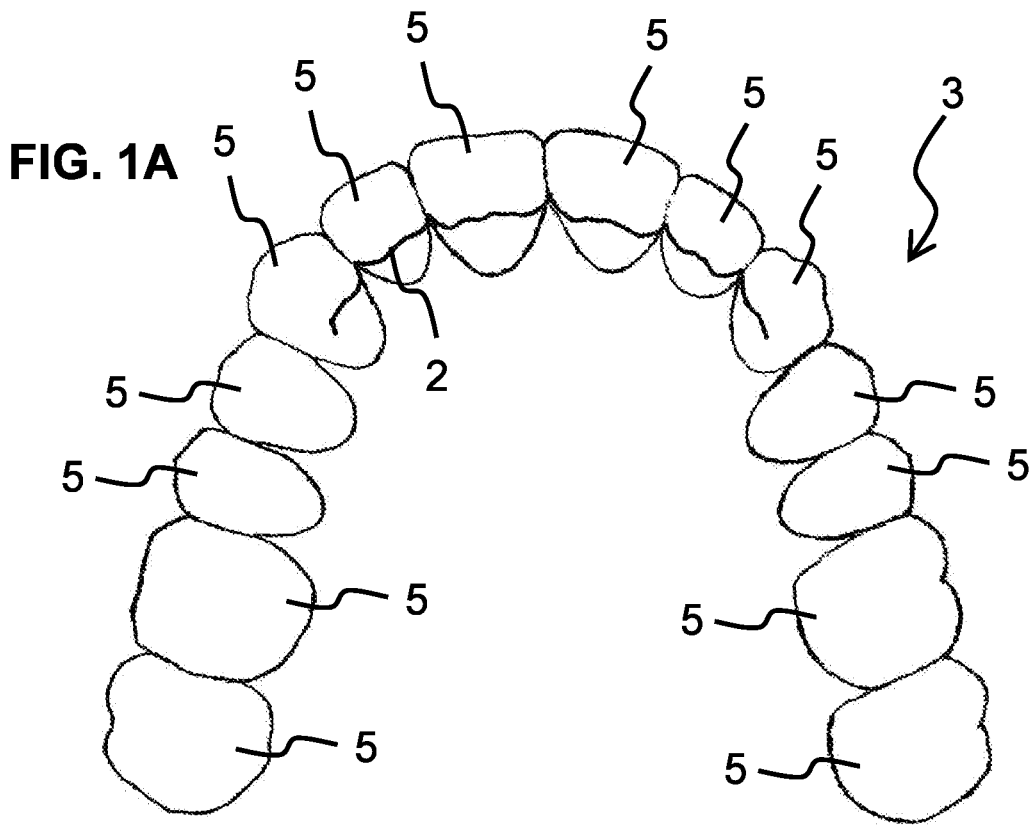
FIG. 1A illustrates a first bonded retainer according to the invention.
Figure 1B:
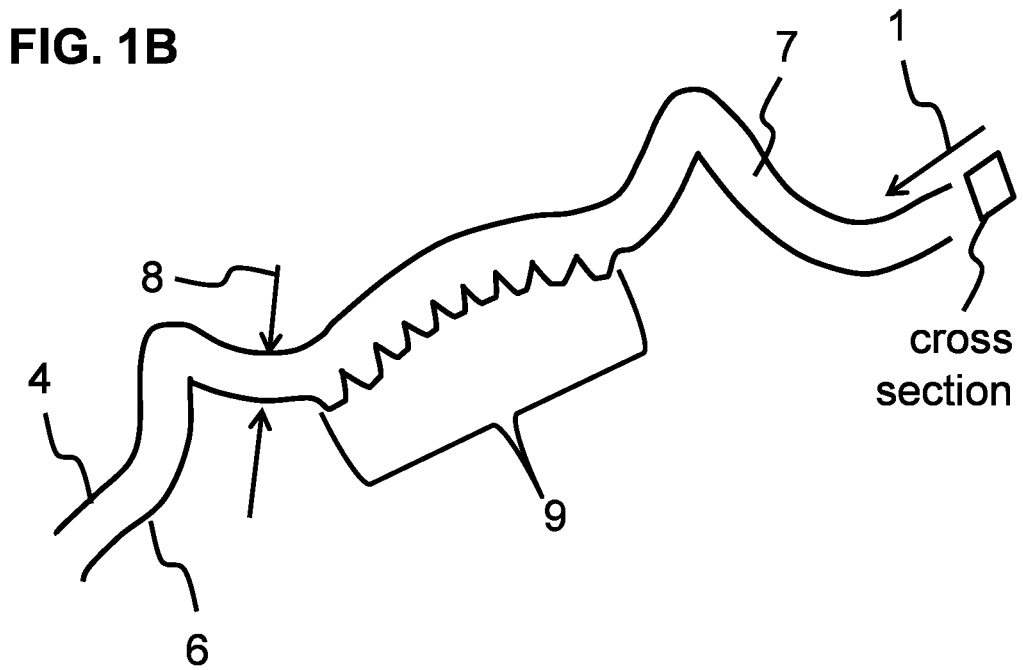
FIG. 1B illustrates a detail of the first bonded retainer according to the invention.
Figure 1C:
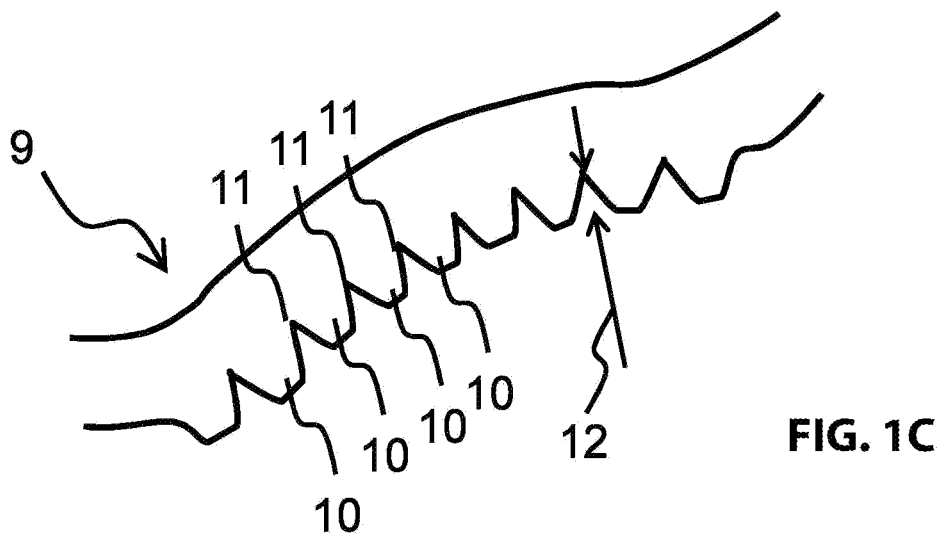
FIG. 1C illustrates a section of the detail of FIG. 1B.

The longitudinal direction 1 of the first wire shaped bonded retainer 2 according to the invention shown in drawing FIGS. 1A-1C follows a parabolic curvature of a jaw 3 of a patient overall. The bonded retainer 2 is cut from a nitinol sheet with a thickness of 0.4 mm and has an essentially rectangular cross section. After cutting the bonded retainer 2 is treated by plasma polishing.

The bonded retainer 2 includes a contact surface 4 that follows locally along a lingual surface contour of the teeth 5 and contacts the teeth 5 in the orthodontic application. A lingual surface 6 that is oriented toward the tongue of the patient runs essentially parallel to the contact surface 4. Sections 7 of surfaces of the sheet close the cross section. The sections 7 have an edge length 8 of at least 0.4 mm in a cross section.

The lingual surface 6 includes sections 9 that are profiled in a saw tooth pattern that include trapezoid retentions 10 with notches 11 that run transversal to the longitudinal direction 1 and that have a height 12 of approximately 0.2 mm. In orthodontic applications the sections 9 are embedded in a nano hybrid composite glue that penetrates into the notches 11 between the retentions 10. After curing the bonded retainer 2 is secured against sliding in the glue joints in the longitudinal direction by positive locking.

Figure 2:
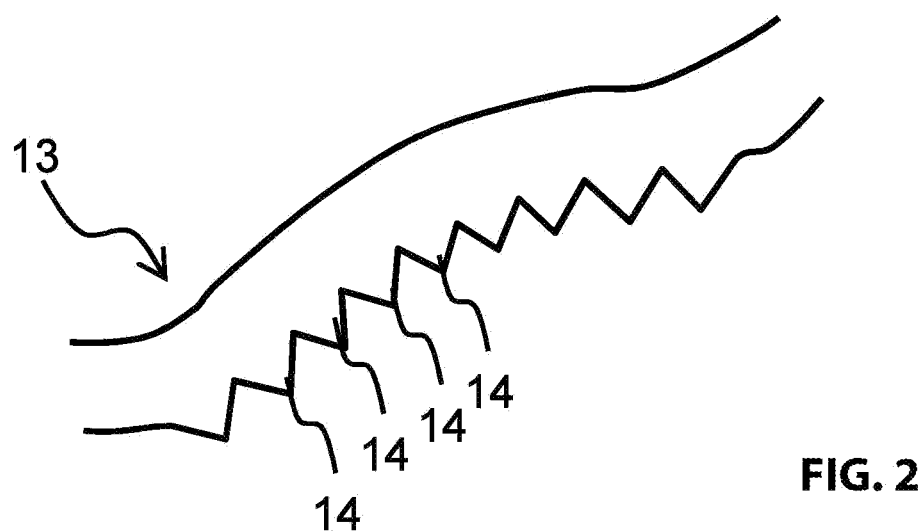
FIG. 2 illustrates a section of a second bonded retainer according to the invention.
Figure 3:
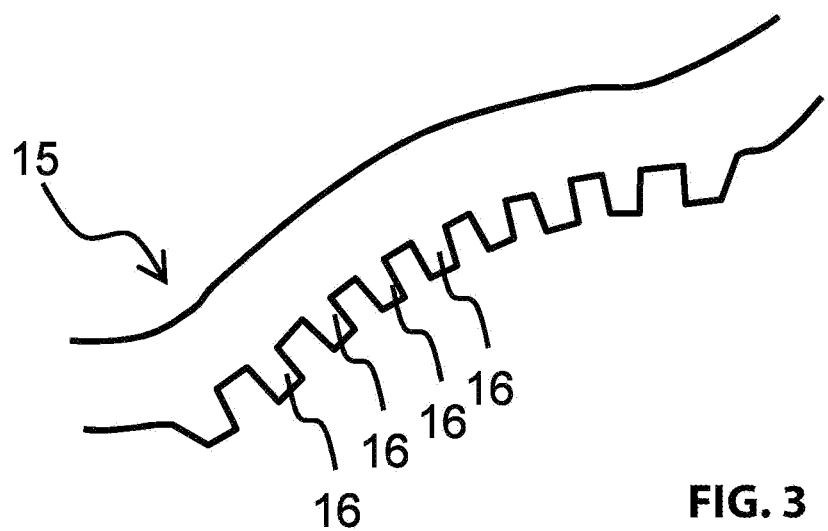
FIG. 3 illustrates a section of a third bonded retainer according to the invention.

FIG. 2 shows a section 13 of a second bonded retainer according to the invention that includes triangular retentions 14. FIG. 3 illustrates a section 15 of a third bonded retainer according to the invention with rectangular retention 16 and accordingly configured rectangular profile notches 17 between the retentions.

The second bonded retainer and the third bonded retainer are identical to the first bonded retainer 2 besides the sections 13 and 15.

Figure 4A:
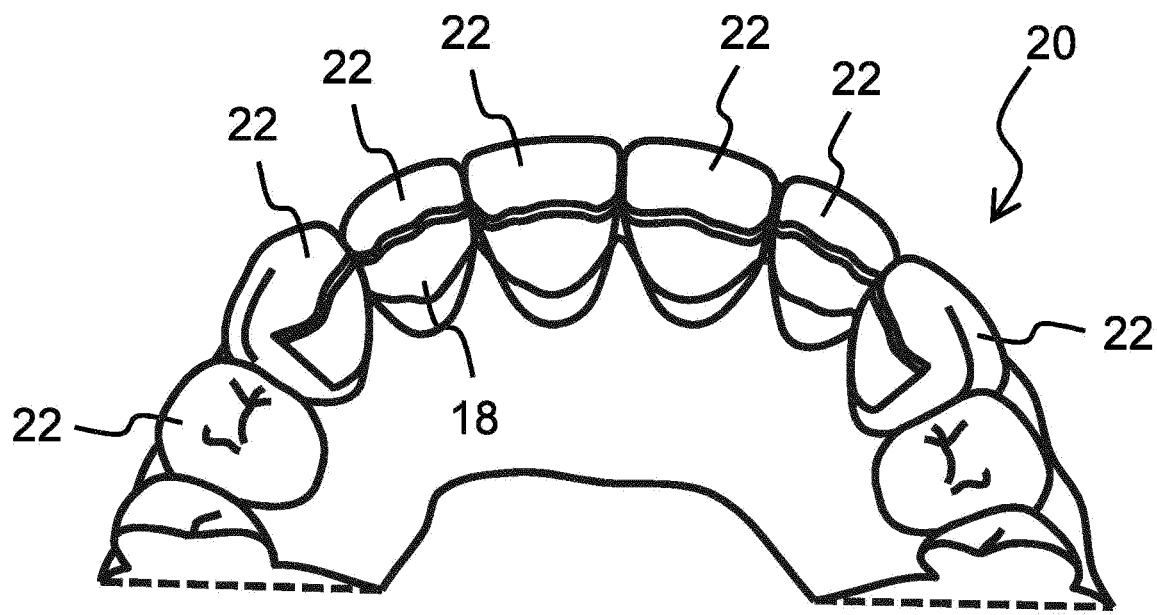
FIG. 4A illustrates a fourth bonded retainer according to the invention.

The fourth bonded retainer 18 shown in FIG. 4A is produced from polyetheretherketone (PEEK) by 3D printing. A longitudinal direction 19 of the fourth bonded retainer 18 follows overall along a parabolic curvature of a jaw 20 of a patient. A contact surface 21 of the fourth bonded retainer 18 follows locally along a lingual surface contour of the teeth 22 and contacts the teeth 22 in the orthodontic application.

Figure 4B:
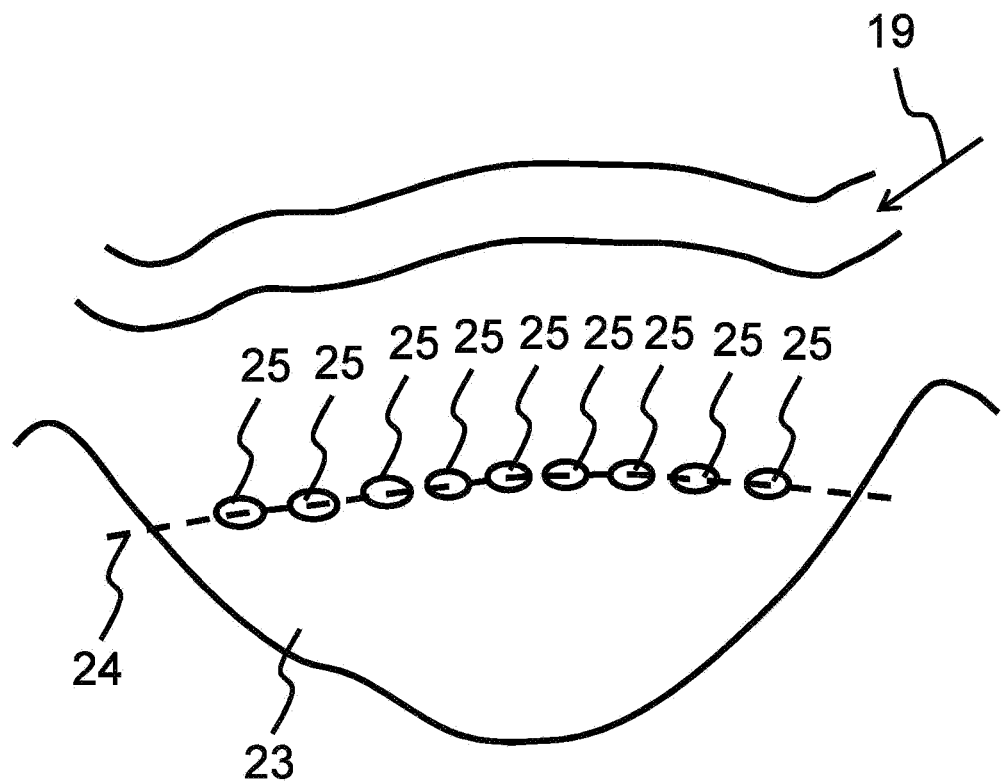
FIG. 4B illustrates a detail of the fourth bonded retainer according to the invention.
Figure 4C:
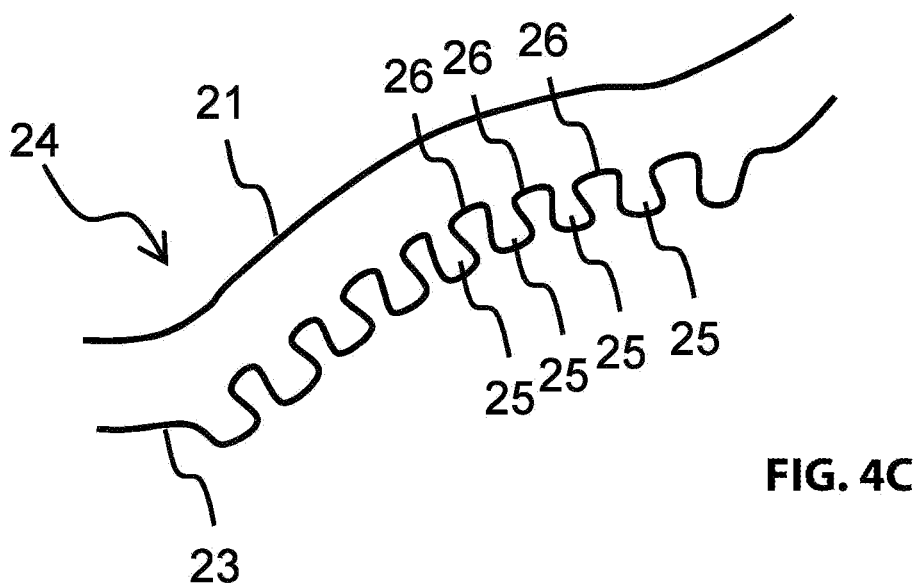
FIG. 4C illustrates a sectional view of the detail of FIG. 4b.
Figure 5:
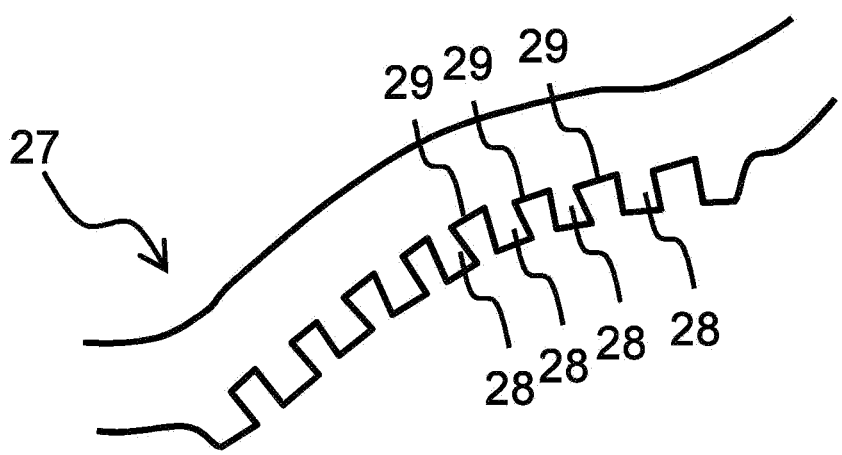
FIG. 5 illustrates a sectional view of a fifth bonded retainer according to the invention.

A lingual surface 23 that is oriented towards a tongue of the patient runs essentially parallel to the contact surface 21, includes mushroom shaped retentions 25 shown in detail in FIG. 4B and in a sectional view in FIG. 4C and includes corresponding notches 20 between the retentions 25. FIG. 5 illustrates a corresponding sectional view 27 through a fifth bonded retainer according to the invention made from PEEK including wedge shaped retentions 28 and corresponding notches 29 between the retentions 28. The fifth bonded retainer is identical to the fourth bonded retainer 18 besides a shape of the retentions.

Figure 6A:
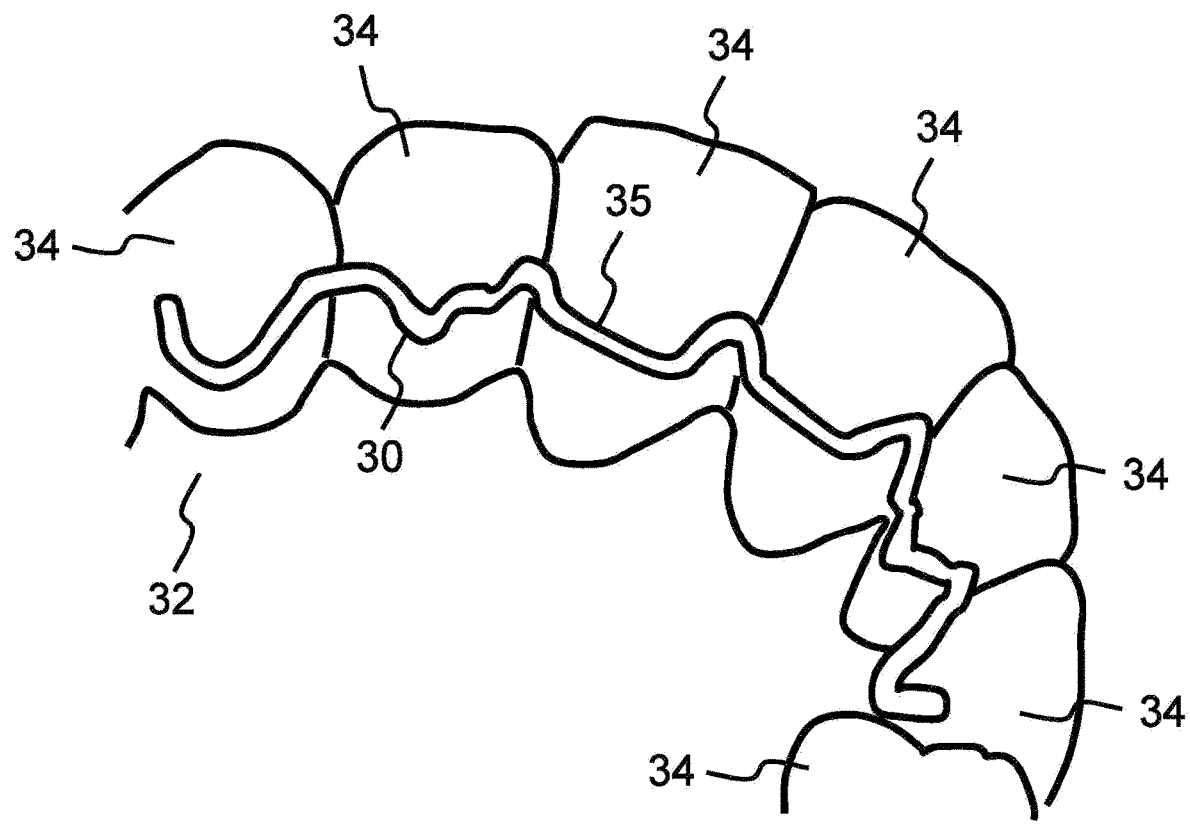
FIG. 6A illustrates a sixth bonded retainer according to the invention.

The sixth bonded retainer according to the invention illustrated in FIG. 6A is made from steel by 3D printing. A longitudinal direction 31 of the sixth bonded retainer 30 follows an overall parabolic curvature of the jaw 32 of the patient. The contact surface 33 of the sixth bonded retainer 30 follows locally along a lingual surface contour of the teeth 34 and contacts the teeth 34 in the orthodontic application.

Figure 6B:
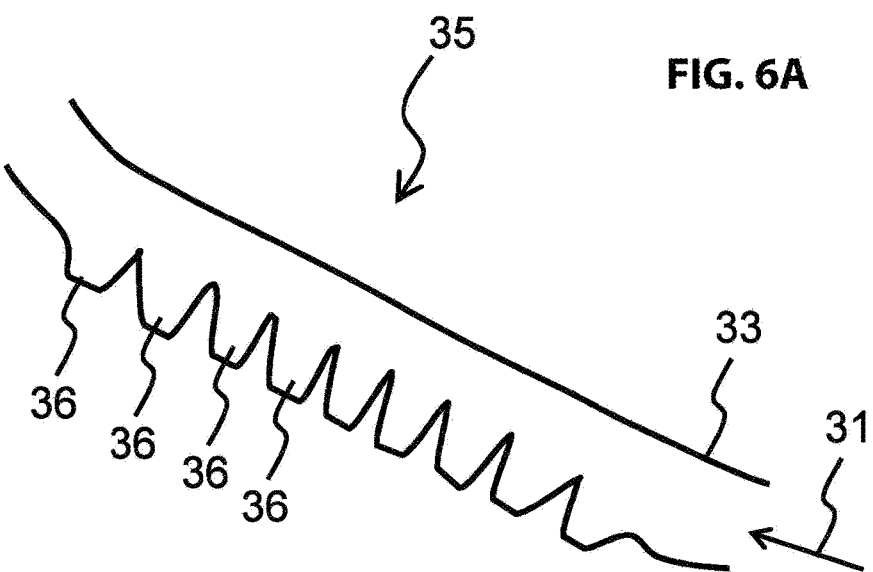
FIG. 6B illustrates a detail of the sixth bonded retainer according to the invention.

In a detail illustrated in FIG. 6B, the essentially straight section 35 of the sixth bonded retainer 30 includes trapezoid retentions 36 that correspond to the first bonded retainer 2 and that fix the sixth bonded retainer 30 in the orthodontic application in a glue joint.

REFERENCE NUMERALS AND DESIGNATIONS 1 longitudinal direction
2 bonded retainer
3 jaw
4 contact surface
tooth
6 lingual surface
7 detail
8 edge length
9 section
10 retention
11 notch
12 depth
13 section
14 retention
15 section
16 retention
17 notch
18 bonded retainer
19 longitudinal direction
20 jaw
21 contact surface
22 tooth
23 lingual surface
24 section
25 retention
26 notch
27 section
28 retention
29 notch
30 bonded retainer
31 longitudinal direction
32 jaw
33 contact surface
34 tooth
35 section
36 retention

What is claimed is:

1. A bonded retainer integrally made from one piece of material and configured to stabilize a plurality of teeth in a jaw, the bonded retainer comprising:
    a continuous contact surface integrally made from the one piece of the material and aligned overall with a parabolic curvature of the jaw in a longitudinal direction of the bonded retainer and is configured to be in direct contact with and aligned locally with a lingual surface contour of the teeth;
    a lingual surface extending lingually in parallel with the continuous contact surface; and
    retentions integrally made from the one piece of the material and extending from the lingual surface away from the teeth transversal to the longitudinal direction and not in contact with the teeth.

2. The bonded retainer according to claim 1, wherein the retentions have a local height of at least 0.05 mm.

3. The bonded retainer according to claim 1, wherein the lingual surface is configured with a saw tooth pattern profile.

4. The bonded retainer according to claim 1, wherein the bonded retainer is wire shaped and cut from a sheet of material so that the continuous contact surface, the lingual surface and two parallel sections of a surface of the sheet form a diamond shaped cross section of the bonded retainer.

5. The bonded retainer according to claim 4, wherein the sheet is made from a shape memory material made from a nickel titanium alloy or from Nitinol.

6. The bonded retainer according to claim 4, wherein the cross section has edge lengths of 0.7 mm at the most.

7. The bonded retainer according to claim 1, wherein the bonded retainer is made by 3D-printing.

8. The bonded retainer according to claim 7, wherein the bonded retainer is made from a thermoplastic synthetic material or from polyetheretherketone.

9. The bonded retainer according to claim 1, wherein the retentions are configured mushroom shaped.

10. The bonded retainer according to claim 1, wherein a surface of the bonded retainer is electropolished or plasma polished.

11. The bonded retainer according to claim 1, wherein the lingual contact surface is configured with a pattern profile.

* * * * *